United States Patent [19]

Lehmann

[11] 4,271,575

[45] Jun. 9, 1981

[54] CONTROLLED DEFLECTION ROLL

[75] Inventor: Rolf Lehmann, Rudolfstetten, Switzerland

[73] Assignee: Escher Wyss Limited, Zürich, Switzerland

[21] Appl. No.: 65,058

[22] Filed: Aug. 9, 1979

[30] Foreign Application Priority Data

Aug. 22, 1978 [CH] Switzerland ............... 8898/78

[51] Int. Cl.³ .................. B30B 15/16; F16C 7/04; B21B 13/14
[52] U.S. Cl. ................. 29/116 AD; 100/47; 100/162 B; 308/9; 72/243
[58] Field of Search ...... 29/116 AD, 113 AD, 116 R; 100/162 B, 162 R, 47, 43; 308/9

[56] References Cited

U.S. PATENT DOCUMENTS

| 3,230,867 | 1/1966 | Nelson | 100/162 R |
| 4,023,480 | 5/1977 | Biondetti | 100/162 B |
| 4,035,038 | 7/1977 | Hinchcliffe et al. | 29/116 R |
| 4,041,752 | 8/1977 | Dolenc et al. | 100/162 B |
| 4,106,405 | 8/1978 | Biondetti et al. | 29/116 AD |

*Primary Examiner*—James Kee Chi
*Attorney, Agent, or Firm*—Werner W. Kleeman

[57] ABSTRACT

A controlled deflection roll comprising a stationary support and a substantially tubular-shaped roll shell rotatable about the stationary support. Hydrostatic pressure or contact elements are provided for the controlled deflection roll and are supported at the stationary support. A pump for infeeding hydraulic pressurized fluid medium, together with its drive motor, is secured at one end of the stationary support. The drive motor can be a rotational speed-regulated motor and is equipped with a regulator to which there is infed the measured signal of a pressure feeler or sensor arranged at the outlet side of the pump. Preferably, a plurality of pumps together with their motors can be attached at a substantially flat end surface or flat side surfaces of the stationary support.

6 Claims, 5 Drawing Figures

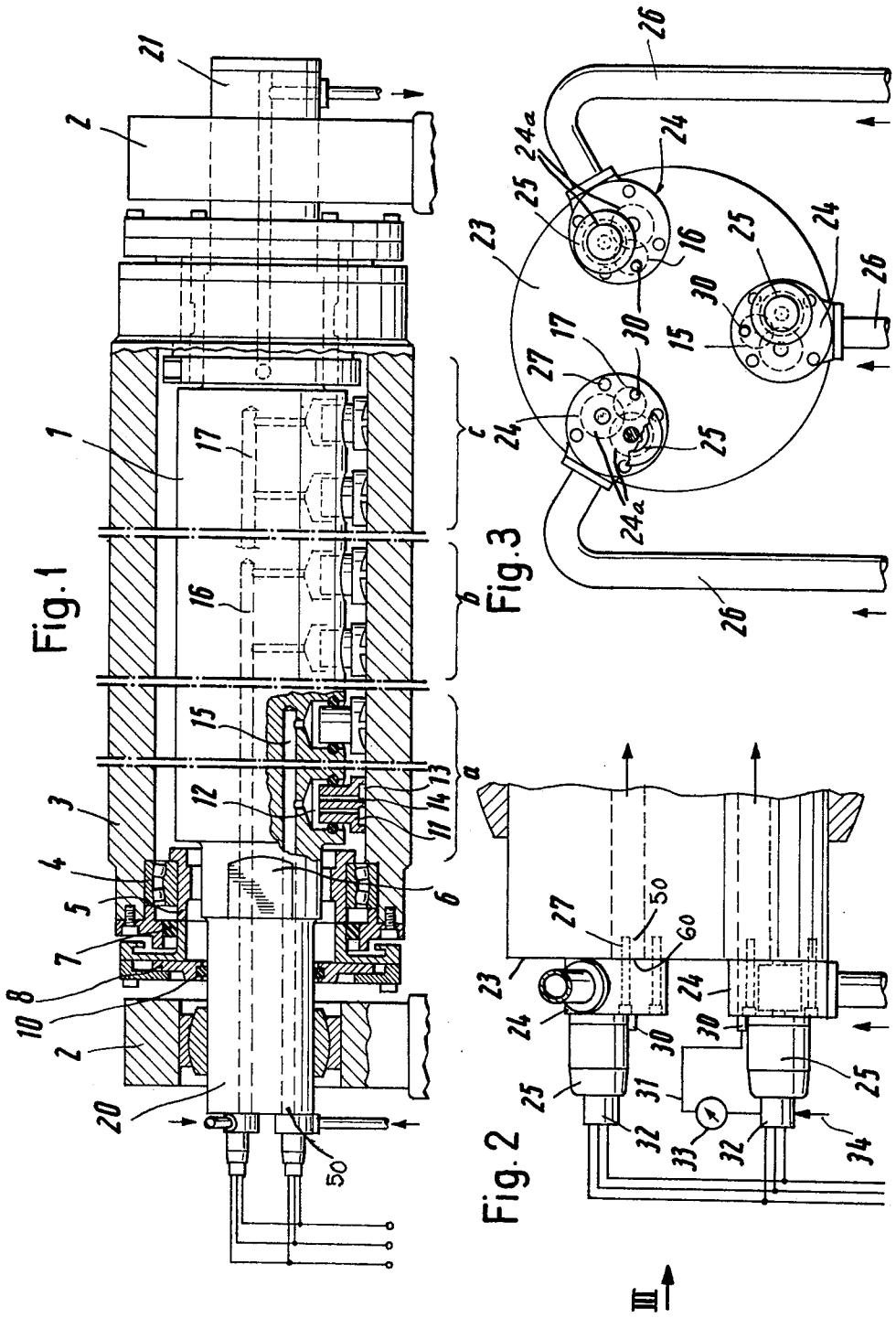

CONTROLLED DEFLECTION ROLL

BACKGROUND OF THE INVENTION

The present invention relates to a new and improved construction of a controlled deflection roll of the type comprising a stationary support and a substantially tubular-shaped roll shell rotatable about such support.

In particular, the controlled deflection roll of the present invention—also sometimes referred to in the art as rolls with bending or sag compensation—possesses hydrostatic pressure or contact elements which are supported at the stationary support, for exerting pressure upon the roll shell and for pressing such against a counter-roll. The hydrostatic pressure or contact elements—sometimes also referred to as support elements—are equipped with pressure spaces or chambers, connected by means of at least one channel formed in the stationary support, with a source of hydraulic pressurized fluid medium. A pump is provided for the source of hydraulic pressurized fluid medium for infeeding the same to the controlled deflection roll.

Controlled deflection rolls of this type are well-known to the art, as exemplified for instance from U.S. Pat. Nos. 3,802,044, granted Apr. 9, 1974; 3,885,283, granted May 27, 1975 and 4,047,273, granted Sept. 13, 1977.

The supply of such prior art controlled deflections rolls with a hydraulic medium at a suitable pressure was heretofore accomplished by supply or infeed installations each having a pump and one or a number of pressure regulating valves. At least the pump, but in many instances however also the pressure-regulating valves, were connected by tubular conduits with the channels provided in the stationary support. These tubular conduits or lines have a relatively large volume and possess elastic walls. There have been encountered situations, such as for instance in rolling mills for rolling metal, where such property is disadvantageous, since, as a result thereof, rapid changes or accommodation of the pressure are rendered more difficult.

SUMMARY OF THE INVENTION

Therefore, with the foregoing in mind it is a primary object of the present invention to provide a new and improved construction of controlled deflection roll which is not afflicted with the aforementioned shortcomings and drawbacks of the prior art constructions.

Another and more specific object of the present invention aims at improving upon the state-of-the-art controlled deflection rolls, with the view of obtaining a controlled deflection roll having a particularly rapid reaction time in the presence of pressure changes.

Still a further significant object of the present invention is directed to a new and improved construction of controlled deflection roll enabling rapid change or accommodation of the pressure of the hydraulic medium effective at the hydrostatic pressure elements with minimum delay in response of such pressure elements to the altered pressure conditions.

Now in order to implement these and still further objects of the invention, which will become more readily apparent as the description proceeds, the controlled deflection roll of the present development is manifested by the features that the pump, together with its drive motor, is attached at one end of the stationary support which protrudes out of the roll shell.

By virtue of the inventive arrangement of the pump directly at the end of the stationary support of the controlled deflection roll, it is possible to beneficially dispense with the use of the heretofore employed tubular conduits or lines which are elastically effective due to their volume and their relatively thin walls. The channels formed in the stationary support only contain a fraction of the heretofore required volume. Additionally, the walls of the channels, formed by the stationary support, are extremely rigid. If there is employed as the feed pump a gear pump for the pressurized fluid medium, then there are formed oscillations, caused by the workings of the gear pump, which arrive without damping at the hydrostatic pressure elements, where they are most beneficial since they eliminate or at least attenuate the effect of friction in the seals.

Preferably, the motor can be constituted by a motor having controlled or regulated rotational speed, and can be provided with a regulator to which there is infed the measured signal of a pressure feeler or sensor arranged at the outlet side of the pump. In the case of an electric motor the regulation can be accomplished completely in the electrical part of the motor. However, it is to be understood that there also can be employed a hydraulic motor. In both instances there are avoided energy losses resulting from throttling regulation valves which were heretofore employed.

Therefore, it is also possible to operatively associate, without any difficulty, with each zone of a controlled deflection roll having a number of pressure zones a pump which is attached at the stationary support.

Preferably, the pumps together with the drive motors flanged thereat, can be secured to a flat or planar end surface of the stationary support, and the channels flow communicating with the hydrostatic pressure element can be connected with the outlets of the pumps. This constructional embodiment has the advantage that it is additionally particularly simple. The pumps also can be, however, secured to the side surfaces of the stationary support.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 1 is a fragmentary front view, partially shown in section, of a controlled deflection roll constructed according to the invention;

FIG. 2 is a fragmentary front view showing details of the left-hand end of the controlled deflection roll illustrated in FIG. 1 and shown on an enlarged scale;

FIG. 3 is an end view of the stationary support of the controlled deflection roll shown in FIG. 2, looking essentially in the direction of the arrow III;

DETAILED DESCRIPTION OF THE PREFERRED EMBODIMENTS

Figure 4:
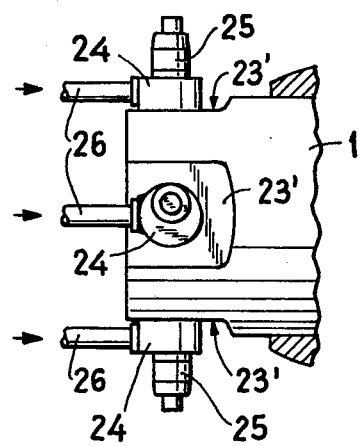
FIG. 4 is fragmentary front view, corresponding to the showing of FIG. 2, of a modified construction of controlled deflection roll.

Describing now the drawings, the exemplary embodiment of controlled deflection roll illustrated by way of example in FIG. 1 will be seen to comprise a stationary support or core 1 which is pivotable in a frame 2 or equivalent structure, but however secured against rotation by conventional but not particularly illustrated anti-rotational means. A substantially tubular-shaped roll shell or jacket 3 is rotatably arranged about the stationary support 1. This roll shell 3 is rotatably mounted in roller bearings 4 upon a guide element or part 5 having an elongate opening possessing not particularly illustrated flat or planar side surfaces guided along flat side surfaces 6 of the stationary support 1. As to this possible construction of controlled deflection roll, enabling movement of the roll shell 3 in relation to the stationary support 1, reference may be had to the previously mentioned U.S. Pat. No. 3,885,283, granted May 27, 1975, the disclosure of which is incorporated herein by reference.

As further seen by referring to FIG. 1, the guide element 5 is sealed in relation to the end of the roll shell 3 by a rotatable seal or sealing means 7. For closing and sealing the intermediate space between the stationary support 1 and the guide element 5 there is provided a sealing plate 8 which is guided in the guide element or part 5 and has a rotatable seal or seal means 10.

Furthermore, the illustrated embodiment of controlled deflection roll will be understood to be provided with hydrostatic pressure or contact elements 11, here shown in the form of piston-like pressure elements, movably guided in substantially cylindrical-shaped bores 12 in the stationary support 1. The piston-like pressure elements 11 are provided in conventional fashion with hydrostatic bearing pockets 13, each of which is flow connected by means of a throttle bore 14 with the cylinder chamber or bore 12. Again, as to the construction and the mode of operation of such type pressure elements, and equally, as concerns the possible variations thereof, reference may be made, purely by way of example and not limitation, to the aforementioned U.S. Pat. No. 3,802,044 granted Apr. 9, 1974, the disclosure of which is incorporated herein by reference.

The hydrostatic pressure elements 11 are grouped together into the pressure element groups a, b and c, forming so-called pressure zones and each can have infed thereto different pressure of the hydraulic pressure medium. For this purpose the pressure or contact elements 11 of the individual groups a, b and c are each connected with individual channels 15, 16 and 17, respectively. In the exemplary showing of controlled deflection roll, as shown in FIG. 1, there have been schematically illustrated three channels 15, 16 and 17, each of which supplies two associated hydrostatic pressure elements 11 of a related group. It is however to be expressly understood that the number of such groups, which form separate pressure zones, can differ from that illustrated, and that as a rule in each group there is contained more than two such pressure elements 11.

Reverting again to FIG. 1, it will be recognized that the stationary support 1 is provided with journals or pins 20 and 21 at its opposed ends and which are supported in the frame or supporting structure 2. The journal 20 has a flat or planar end surface 23 containing the inlet openings, generally indicated by reference character 50, of the related channels or ducts 15, 16 and 17. Operatively associated with each of these channels or ducts, 15, 16 and 17 is a pump 24, here assumed to be a gear pump containing the meshing gears 24a as shown in FIG. 3, which, in turn, is connected with a rotational speed-regulated drive motor 25, here shown as an electric drive motor. The pumps 24 are connected with infeed lines or conduits 26 for the hydraulic pressure or pressurized fluid medium and are secured at the end surface 23 by any suitable fastening devices 27, such as screws or bolts or equivalent structure, in a manner such that their pump outlets, generally indicated by reference character 60 directly merge with the inlets 50 of the channels 15, 16 and 17.

As particularly well seen by referring to FIG. 2, a pressure feeler or sensor 30 is installed at each of the gear pumps 24. Each such pressure feeler 30 is responsive to the pressure prevailing at the outlet 60 of the related pump 24, and thus, also to the pressure which prevails in the related channel or duct 15, 16 and 17. Each pressure feeler 30 delivers its measured signal, by means of a signal line or conductor 31, to an associated regulator 32. A measuring device 33 can be arranged in the related signal line or conductor 31, serving to indicate the momentary pressure delivered by the corresponding pump 24. Each regulator 32 is provided with a set or reference value input 34, compares the measured value with the reference value and thus appropriately regulates the rotational speed or torque of the related pump 24. Details of the regulator 32 are unimportant for understanding the invention beyond the specific function thereof described above, but by way of example such may be constructed to embody a standard comparator, for instance constituted by an operational amplifier, which, as stated, compares the measured value and the reference value, and upon the presence of a difference therebetween delivers a suitable control signal which influences the rotational speed or rotational moment of the related pump 24.

Continuing, and as should be appreciated from the foregoing description and the illustration of controlled deflection roll appearing in the drawings, due to the omission of the external conduits or piping, the lines leading from the pressurized medium source up to the region of the piston-like hydrostatic pressure elements 11 and the channels have an appreciably smaller volume than was heretofore the case. Additionally, the walls of the channels or ducts 15, 16 and 17 formed in the stationary support 1 are essentially more rigid than the external tubular lines heretofore employed, so that the undesirable elasticity phenomenon is not present for such components.

Although in the showing of FIG. 2 there has been illustrated only one signal line or conductor 31, leading from the pressure feeler 30 to the related regulator 32, it should be understood that all of the drive motors 25 and regulators 32 are provided with such signal lines.

Figure 5:
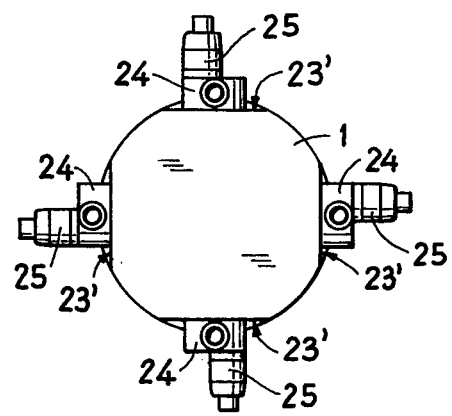
FIG. 5 is an end view, corresponding to the showing of FIG. 3 of the controlled deflection roll illustrated in FIG. 4.

Finally, in FIGS. 4 and 5 there has been shown, similar to the illustration of FIGS. 2 and 3, a construction of controlled deflection roll wherein the pumps 24 are secured to flat side surfaces 23' of the stationary support 1 of the controlled deflection roll. The pumps 24, connected at the infeed lines or conduits 26, deliver their pressurized fluid medium to not particularly here shown channels provided in the stationary support 1, in the same manner as explained above for the embodiment of FIGS. 2 and 3.

It should be understood that the constructional embodiments of FIGS. 2, 3 and FIGS. 4, 5 can be combined with one another. Also, the pumps can be arranged at both ends of the stationary support of the controlled deflection roll.

While there are shown and described present preferred embodiments of the invention, it is to be distinctly understood that the invention is not limited thereto, but may be otherwise variously embodied and practised within the scope of the following claims. Accordingly,

What I claim is:

1. A controlled deflection roll comprising:
    a stationary support;
    a substantially tubular-shaped roll shell;
    means for mounting said substantially tubular-shaped roll shell to be rotatable about said stationary support;
    a plurality of hydrostatic pressure elements located between said stationary support and said roll shell;
    said hydrostatic pressure elements being supported at said stationary support and serving to exert pressure upon the roll shell and being capable of urging said roll shell in the direction of a countersupport;
    means providing a pressure chamber for each hydrostatic pressure element;
    at least one channel provided in said stationary support;
    source means for hydraulic pressurized fluid medium;
    said pressurised fluid medium-source means containing a pump for the infeed of hydrolic pressurized fluid medium, by means of said at least one channel, to said hydrostatic pressure elements;
    a drive motor for driving said pump;
    said stationary support including an end protruding out of said roll shell; and
    said pump together with its drive motor being carried by said protruding end of said stationary support.

2. The controlled deflection roll as defined in claim 1, wherein:
    said drive motor comprises a rotational speed-regulated motor;
    a regulator provided for said drive motor;
    said pump having an outlet;
    a pressure feeler arranged at the outlet of said pump;
    said pressure feeler delivering a measured signal representative of the outlet pressure of the pump to said regulator.

3. The controlled deflection roll as defined in claim 1 or 2, wherein:
    said hydrostatic pressure elements being divided into groups of hydrostatic pressure elements;
    separate means for infeeding the hydraulic pressurized fluid medium at different pressures to said groups of hydrostatic pressure elements;
    each infeeding means having operatively associated therewith a respective pump which is carried by the stationary support.

4. The controlled deflection roll as defined in claim 3, wherein:
    each of said pumps is provided with its own related drive motor;
    said stationary support having a substantially flat end surface;
    each of said pumps and its therewith connected drive motor being attached at said flat end surface of the stationary support;
    said infeed means being constituted by separate channels leading to the groups of pressure elements and merging directly with the respective outlet of the related pump.

5. The controlled deflection roll as defined in claim 3, wherein:
    each of said pumps being provided with a drive motor connected therewith;
    said stationary support having at least one substantially flat side surface;
    said pumps together with the therewith connected drive motors being attached to said flat side surface of said stationary support;
    said infeed means including separate channels each leading to a related group of said pressure elements; and
    said channels directly merging with a respective outlet of the related pump.

6. The controlled deflection roll as defined in claim 1, wherein:
    said pump comprises a gear pump.

* * * * *